United States Patent
Shabbir et al.

(10) Patent No.: US 10,838,471 B2
(45) Date of Patent: Nov. 17, 2020

(54) SYSTEM FOR ESTIMATING AIRFLOW EXITING AN INFORMATION HANDLING SYSTEM AND METHOD THEREFOR

(71) Applicant: DELL PRODUCTS, LP, Round Rock, TX (US)

(72) Inventors: Hasnain Shabbir, Round Rock, TX (US); Brently Lynn Cooper, Mendham, NJ (US)

(73) Assignee: Dell Products, L.P., Round Rock, TX (US)

( * ) Notice: Subject to any disclaimer, the term of this patent is extended or adjusted under 35 U.S.C. 154(b) by 98 days.

(21) Appl. No.: 16/271,143

(22) Filed: Feb. 8, 2019

(65) Prior Publication Data

US 2020/0257343 A1 Aug. 13, 2020

(51) Int. Cl.
*G06F 1/20* (2006.01)
*G05B 19/042* (2006.01)

(52) U.S. Cl.
CPC ........... *G06F 1/206* (2013.01); *G05B 19/042* (2013.01); *G05B 2219/2614* (2013.01)

(58) Field of Classification Search
CPC .................. G06F 1/206; G05B 19/042; G05B 2219/2614
See application file for complete search history.

(56) References Cited

U.S. PATENT DOCUMENTS

| | | | |
|---|---|---|---|
| 6,573,671 B2 | 6/2003 | Montero et al. | |
| 9,968,011 B2 | 5/2018 | Shabbir et al. | |
| 10,156,987 B1 * | 12/2018 | Gutierrez | G06F 1/3268 |
| 10,331,189 B2 * | 6/2019 | Lovicott | H04L 12/12 |
| 2006/0168975 A1 * | 8/2006 | Malone | H05K 7/20836 62/180 |
| 2016/0102880 A1 * | 4/2016 | Lovicott | H05K 7/20727 700/300 |
| 2017/0079160 A1 | 3/2017 | Ragupathi et al. | |
| 2017/0285699 A1 * | 10/2017 | Ahuja | G06F 1/3203 |
| 2017/0336838 A1 * | 11/2017 | Ragupathi | G06F 1/206 |
| 2018/0035572 A1 * | 2/2018 | Song | G05B 13/04 |

* cited by examiner

*Primary Examiner* — Vincent H Tran
(74) *Attorney, Agent, or Firm* — Larson Newman, LLP

(57) ABSTRACT

An information handling system includes a baseboard management controller (BMC) storing characterization data identifying a thermal resistance of a system component as a function of airflow. The BMC can perform measurements to determine a thermal resistance of the system component as a function of the speed of a system cooling fan. The BMC can determine a relationship between the fan speed and airflow at the information handling system based on the measurements and the characterization data.

20 Claims, 5 Drawing Sheets

SYSTEM FOR ESTIMATING AIRFLOW EXITING AN INFORMATION HANDLING SYSTEM AND METHOD THEREFOR

FIELD OF THE DISCLOSURE

This disclosure relates generally to information handling systems, and more particularly relates to estimating airflow exiting an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. When information handling systems are aggregated in great numbers at data centers, management of cooling systems is important.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system may include a baseboard management controller (BMC) storing characterization data identifying a thermal resistance of a system component as a function of airflow. The BMC can perform measurements to determine a thermal resistance of the system component as a function of the speed of a system cooling fan. The BMC can determine a relationship between the fan speed and airflow at the information handling system based on the measurements and the characterization data.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

A data center is a facility used to house information handling systems and associated components. A data center can include hundreds or thousands of individual information handling systems such as servers, data storage devices, network devices, and the like. During operation, these information handling systems can generate considerable heat, which should be dissipated to ensure optimal performance and reliability. Each information handling system typically includes one or more cooling fans that draw in cool air from the data center environment and exhaust warm air, having extracted heat from heat-generating components within the system. The operating speed of these fans at each system can change dynamically based on a workload that the system is processing at a particular time. FIGS. 1-7 illustrate techniques for estimating a measure of airflow emanating from individual information handling systems. The airflow information can be used by a data center cooling system to regulate operation of air refrigerant systems and the like.

Figure 1:
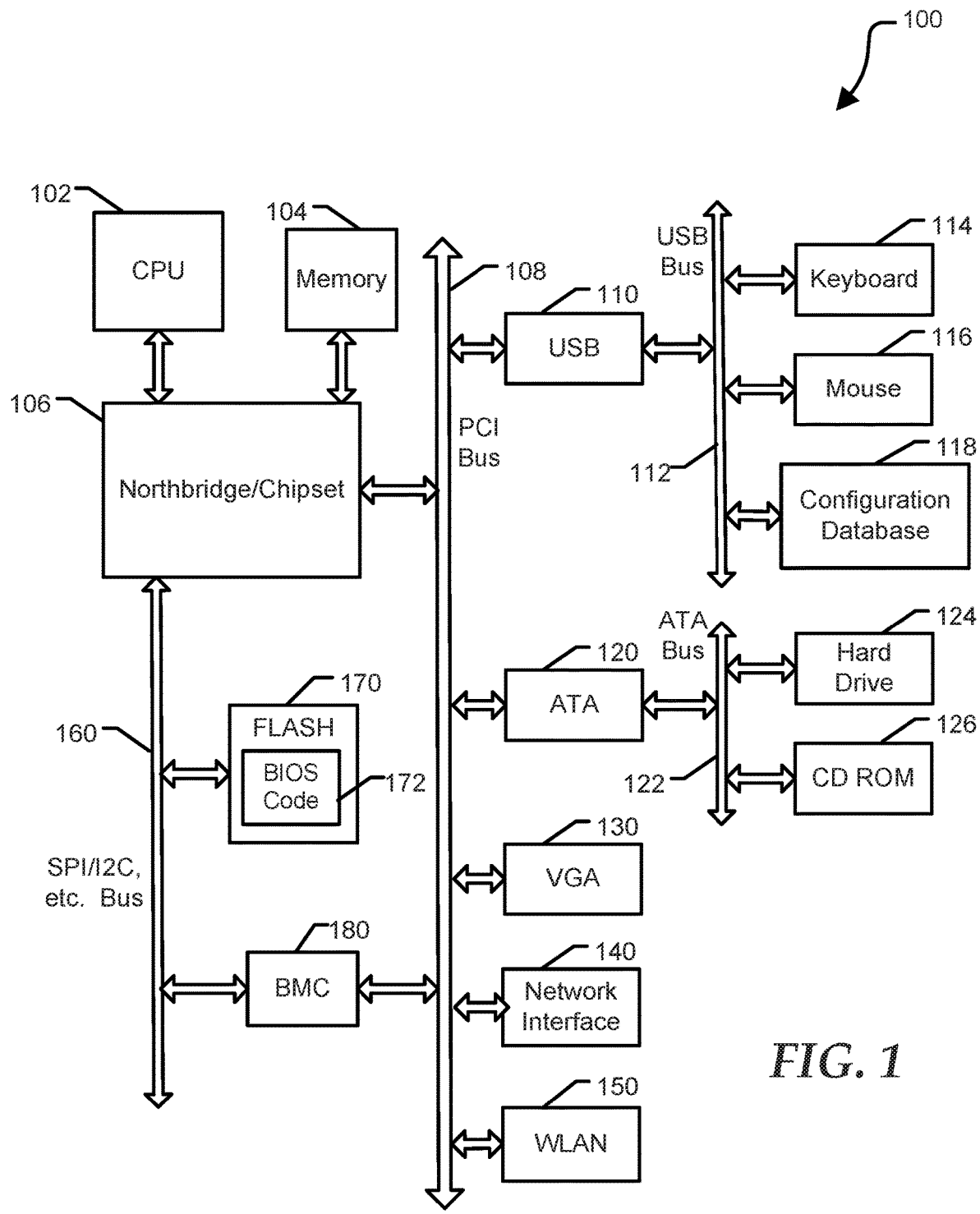
FIG. 1 is a block diagram of an information handling system according to an embodiment of the present disclosure.

FIG. 1 illustrates an information handling system 100 including a processor 102, memory devices 104, a platform controller hub (PCH)/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170, and a baseboard management controller (BMC) 180. NVRAM 170 can store a basic input/output system (BIOS) 172.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of PCH 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BMC 180 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. BMC 180 can provide a network interface, a graphical user interface (GUI) and an application programming interfaces (API) to support remote management of system 100. In an embodiment, BMC 180 can include one or more proprietary or standardized bus interfaces, for example USB, I2C, PCI, and the like.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100, including support of the techniques described below.

Figure 2:
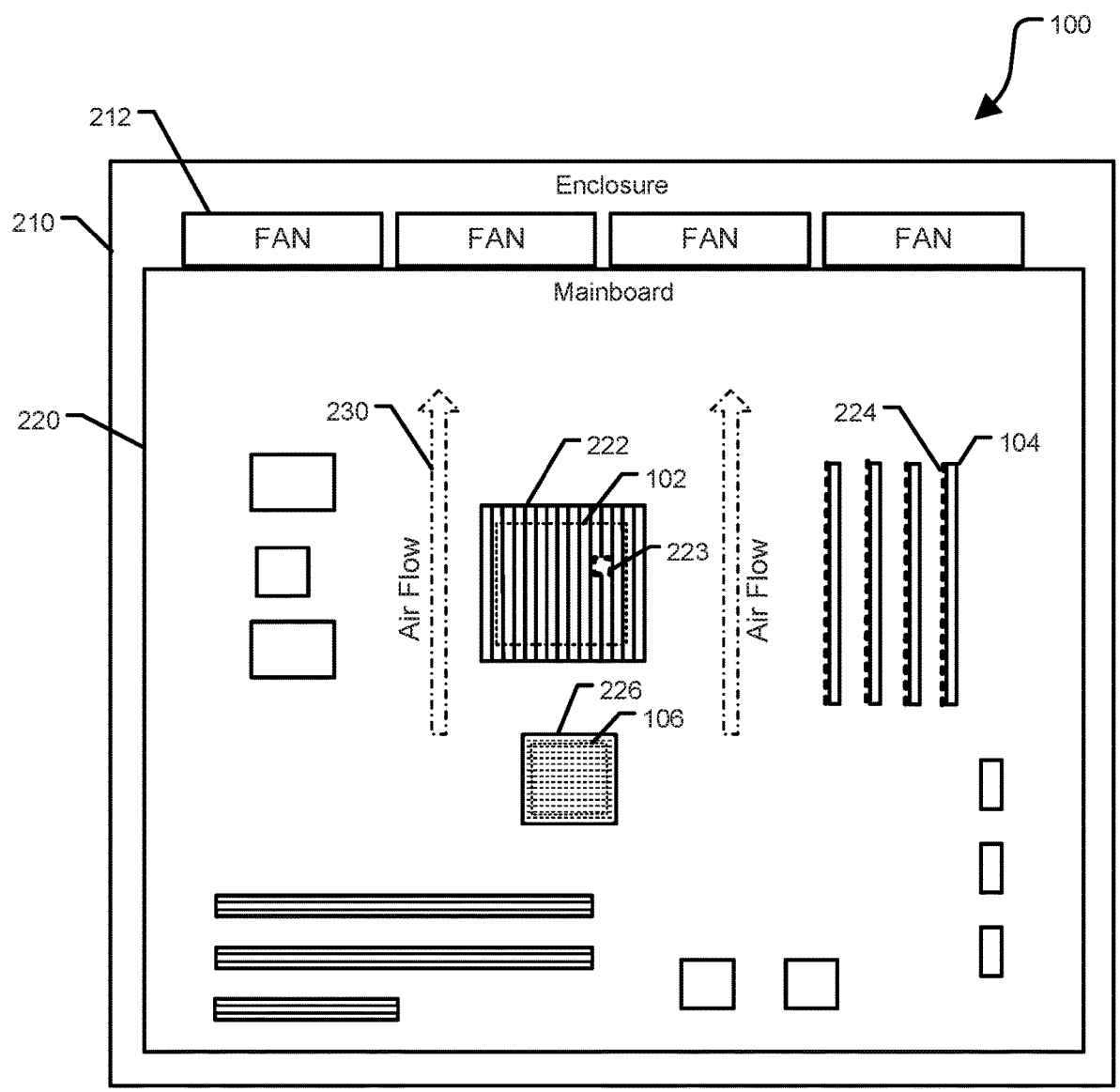
FIG. 2 is a block diagram illustrating a simplified view of an information handling system according to a specific embodiment of the present disclosure.

FIG. 2 shows a simplified view of information handling system 100 according to a specific embodiment of the present disclosure. Information handling system 100 includes an enclosure 210, cooling fan(s) 212, and a mainboard 220. Mainboard 220, often refereed to as a mother board, is a printed circuit board that includes all or most of the components identified in FIG. 1. In particular, mainboard 220 includes CPU 102, memory devices 104, and PCH 106. CPU 102 includes an attached heatsink 222 and an internal thermal sensor 223. Memory devices 104, as illustrated, include four dual-inline-memory-modules (DIMMs), each DIMM including an attached heatsink 224. PCH 106 includes an attached heatsink 226. Each of memory devices 104 and PCH 106 typically includes a thermal sensor (not shown at FIG. 2). Mainboard 220 can include additional components, of which some are illustrated without reference numbers for simplicity. Arrows 230 illustrate airflow provided during operation by fan(s) 212. Critical heat generating components including CPU 102, memory 104, and PCH 106 are arranged at mainboard 220 so that they are subject to a considerable, if not a majority, of airflow 230 so that heat can best be extracted from these devices and expelled from enclosure 210.

A data center may request or require a supplier of information handling systems to provide airflow information for each system installed at the data center. Traditionally, a supplier of information handling system may characterize airflow as a function of fan speed on each system installed at the data center, or on a representative sample of every unique system configuration included at the data center. Airflow exhausting from an information handling system can vary considerably based on how each system is configured, for example a number of PCI cards inserted into the mainboard 220, a number of storage devices, memory devices, and the like. Because various internal components can impede airflow provided by the fan(s) 212, the term system impedance is used herein to describe a degree of airflow restriction caused by various system configurations. Characterizing the system impedance corresponding to all possible configurations of systems that may be found in a data center can be time consuming and expensive. In addition, characterization data of individual systems would be rendered inaccurate if the component configuration of the system were to change following characterization. The techniques disclosed herein automatically account for system configuration impedance, without having to identify system configuration based on system inventory details.

As disclosed herein, CPU 102 can be used to estimate airflow volume exiting information handling system 100. In particular, the thermal resistance of CPU 102 is impacted by airflow passing through heatsink 202. The thermal resistance of CPU 102 is defined by equation (1):

$$\text{Theta } ja = (\text{CPU Temp} - \text{Ambient Temp})/\text{CPU power} \quad (1)$$

Where CPU Temp is a temperature at the integrated circuit die of CPU 102 provided by thermal sensor 223, Ambient Temp is a temperature of air circulating through heatsink 222 that can be determined by another thermal sensor included at system 100 (not shown at FIG. 2), and CPU power is a product of voltage and current supplied to CPU 102 during operation. CPU power can be regulated based on controlling a computational workload at CPU 102. Alternatively, other heat generating components that include a thermal sensor and some form of heat sink, for example memory devices 104, PCH 106, and the like, may be utilized. Accordingly, the disclosed techniques can be implemented without adding additional components to system 100, thereby reducing system cost.

As described in detail below with reference to FIGS. 3-7, the thermal resistance of CPU 102 and associated heatsink 222 is characterized as a function of airflow using a dedicated test fixture. The characterization data can be stored at a memory device included at system 100, for example BMC 180. During operation of system 100, the thermal resistance of CPU 102 is determined as a function of the operating speed of cooling fans 212. The airflow exhausted from system 100 can be determined based on the thermal resistance, the fans speed, and the characterization data stored at BMC 180.

Figure 3:
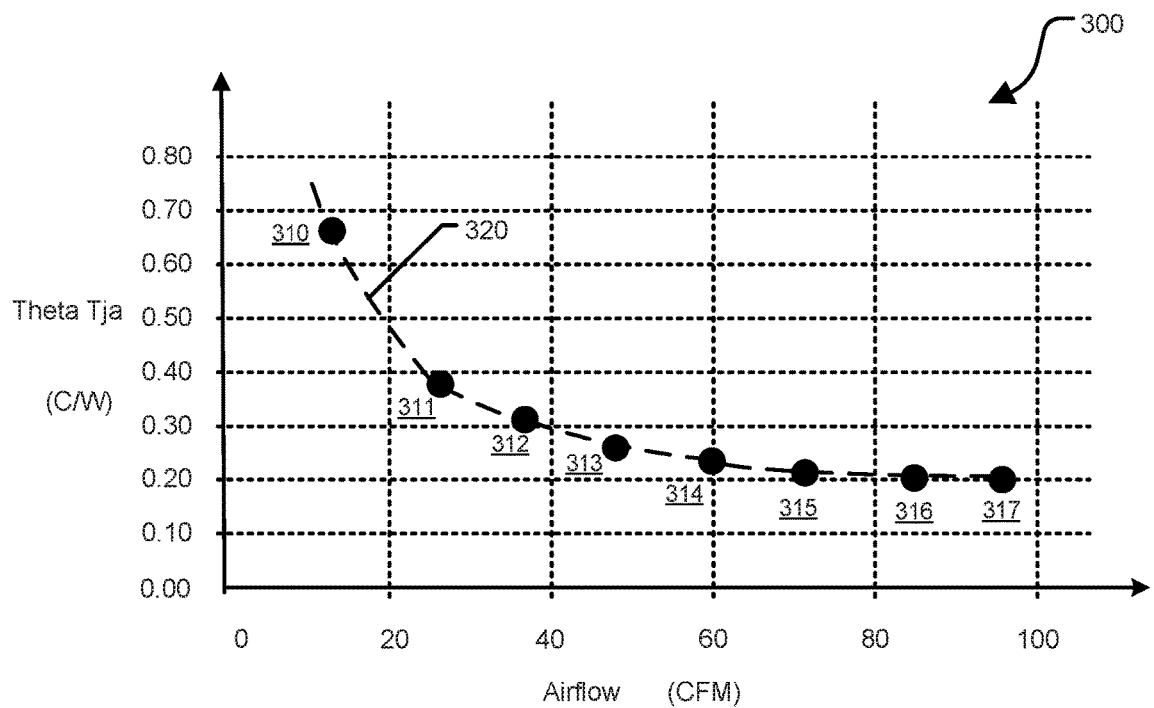
FIG. 3 is a graph identifying a relationship between airflow and thermal resistance of a CPU as determined in a test fixture, according to a specific embodiment of the present disclosure.

FIG. 3 shows a graph 300 identifying a relationship between airflow and thermal resistance of CPU 102 and associated heatsink 222 as determined in a test fixture, according to a specific embodiment of the present disclosure. Graph 300 includes a horizontal axis representing airflow in units of cubic feet per minute (CFM), and a vertical axis representing thermal resistance, Theta Tja, in units of degrees Centigrade per watt. Graph 300 further includes characterization data 320, including data points 310, 311, 312, 313, 314, 315, 316, and 317. Characterization data 320 can be collected in a test fixture where CPU 102 is remote from mainboard 220, or alternatively with CPU included at mainboard 220. The test fixture can include one or more fans, ducting, a plenum chamber, airflow sensors, and the like. In an embodiment, the characterization process can include configuring a computational workload executing at CPU 102 so as to maintain a predetermined level of power consumption, and accordingly heat generation, at CPU 102. Airflow circulating through heatsink 222 can be adjusted to a set of predetermined values, for example airflow values corresponding to each of data points 310-317.

The characterization process can be performed by an original equipment manufacturer (OEM) and characterization data can be generated for each type of CPU and heatsink combination that may be incorporated at information handling systems provided by the OEM. In an embodiment, characterization data 320 can be stored at a memory device included at information handling system 100, for example at a memory device included at BMC 180.

Figure 4:
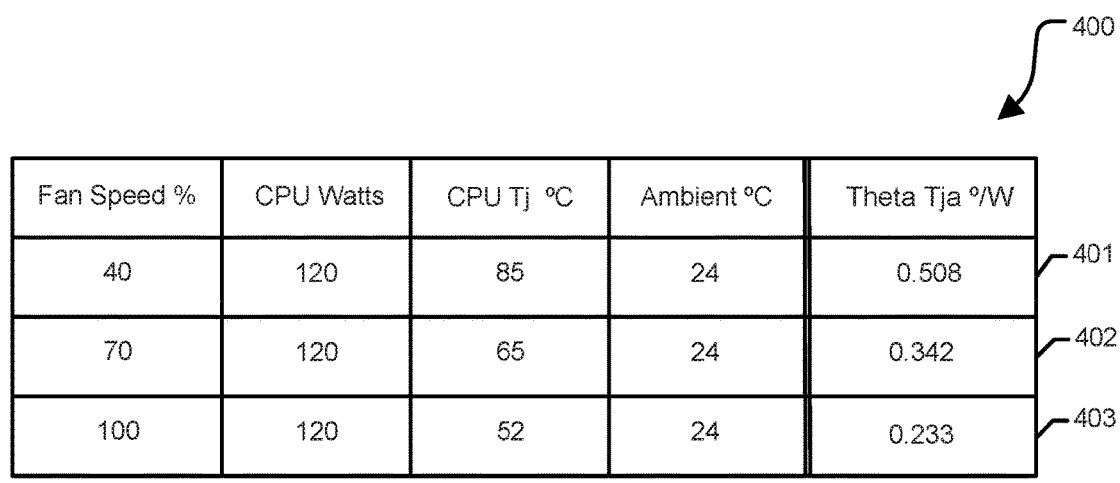
FIG. 4 is a table illustrating thermal resistance measurements performed at an information handling system according to a specific embodiment of the present disclosure.

FIG. 4 shows a table 400 of thermal resistance measurements performed at an information handling system according to a specific embodiment of the present disclosure. Table 400 illustrates a relationship between fan speed at information handling system 100 and the thermal resistance of CPU 102. The measurements are performed on a fully configured information handling system, for example a system that includes all internal components that affect airflow impedance. Table 400 includes five columns and three rows, including rows 401, 402, and 403. The columns at table 400 include fan speed, CPU power consumption, CPU junction temperature, ambient temperature, and CPU thermal resistance. Rows 401, 402, and 403 correspond to a set of predetermined fan speeds, for example 40%, 70%, and 100%, respectively. The measurements are collected while information handling system 100 is operational. In particular, CPU 102 is configured to execute a computational workload, for example a test program selected to maintain a predetermined level of power consumption. A power consumption of 120 Watts has been selected in the present example. The selected power consumption is maintained throughout the measurement procedure. In an embodiment, the test program can be executed for a predetermined time before collecting each measurement to allow the temperature of CPU 102 to stabilize. Similarly, a temperature at CPU 102 can be given time to stabilize following configuration of a new fans peed before performing a corresponding measurement.

In an embodiment, BMC 180 can control the speed of fan(s) 212, perform the temperature measurements, and compute the thermal resistance values. The first row 401 of table 400 corresponds to a speed of fan(s) 212 of 40%. The junction temperature of CPU 102 is determined by thermal sensor 223, which can be interrogated by BMC 180. BMC 180 can also measure the ambient temperature at system 100, for example using a temperature sensor at main board 220 that is proximate to CPU 102. In the present example, the junction temperature at CPU 102 corresponding to a fan speed of 40%, is 85° C., and the ambient temperature of air proximate to CPU 102 is 24° C. The thermal resistance of CPU 102, Theta Tja, can be calculated using equation (1) above. In the present example, the thermal resistance of CPU 102 corresponding to a fan speed of 40% is 0.508° C./W. The second row 402 corresponds to a fan speed of 70%, which provides additional cooling so that the junction temperature is reduced to 65° C. Again using equation (1), BMC 180 can determine that the thermal resistance of CPU 102 is now 0.342° C./W. The third row 403 corresponds to a fan(s) 212 operating a full speed, 100%. The junction temperature at CPU 102 is 52° C., which corresponds to a thermal resistance of 0.233° C./W. One of skill will appreciate that another value of power consumption and alternative values of fan speed can be utilized.

Figures 5, 6:
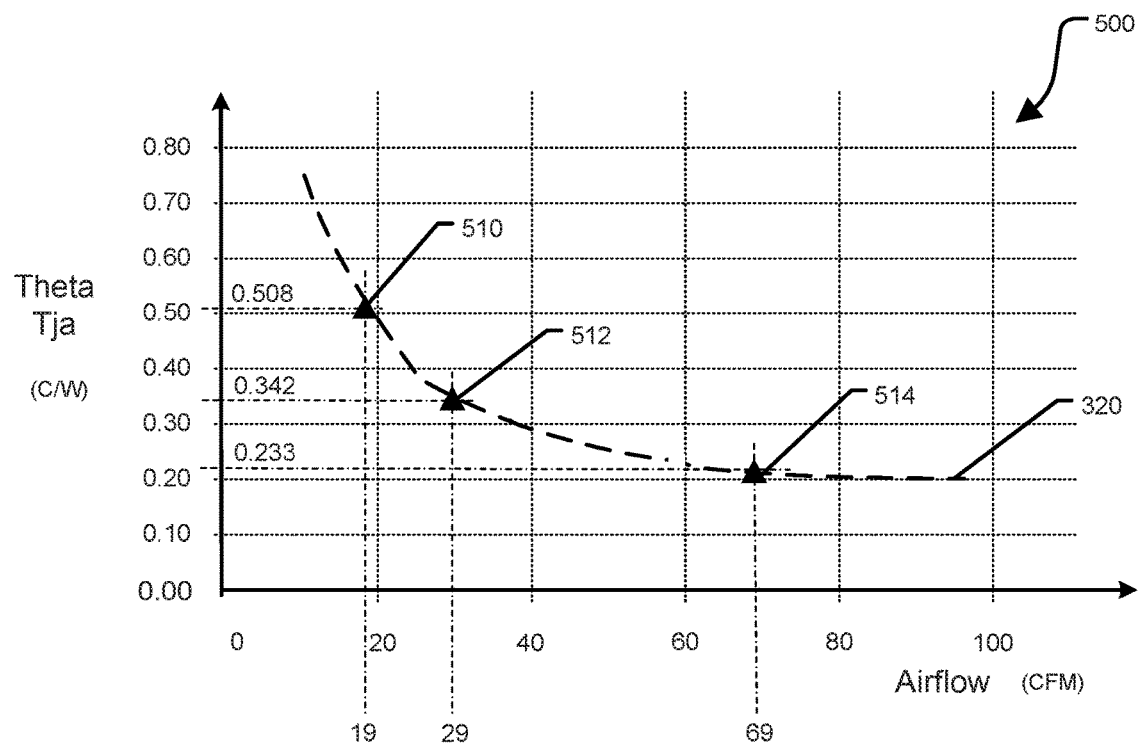
FIG. 5 is a graph illustrating the characterization data of FIG. 3 annotated with the thermal resistance measurements of FIG. 4, according to a specific embodiment of the present disclosure.
FIG. 6 is a table illustrating a correlation between fan speed and airflow at an information handling system according to a specific embodiment of the present disclosure.

FIG. 5 shows the characterization data of FIG. 3 annotated with the thermal resistance measurements of FIG. 4 at a graph 500, according to a specific embodiment of the present disclosure. Graph 500 includes characterization data 320 as described above with reference to FIG. 3. Graph 500 also includes data points 510, 512, and 514, corresponding to the thermal resistance values at rows 401, 402, and 403 at FIG. 4, respectively. For example, data point 510 corresponds to a thermal resistance at CPU 102 of 0.508° C./W and a fan speed at information handling system 100 of 40%. A thermal resistance value of 0.508° C./W correlates with an airflow of 19 CFM based on characterization data 320. Data point 512 corresponds to a thermal resistance at CPU 102 of 0.342° C./W and a fan speed of 70%. A thermal resistance value of 0.342° C./W correlates with an airflow of 29 CFM based on characterization data 320. Data point 514 corresponds to a thermal resistance at CPU 102 of 0.233° C./W and a fan speed of 100%. A thermal resistance value of 0.233° C./W correlates with an airflow of 69 CFM based on characterization data 320.

FIG. 6 shows a table 600 specifying a correlation between fan speed and airflow at an information handling system according to a specific embodiment of the present disclosure. Table 600 includes the same five columns and measurements of table 400, and further includes a sixth column representing airflow as derived above with regard to FIG. 5. For example, row 601 shows that a fan speed at information handling system 100 of 40% results in a thermal resistance of CPU 102 of 0.508° C./W, which corresponds to an airflow of 19 CFM according to characterization data 320. Row 602 shows that a fan speed of 70% results in a thermal resistance of 0.342° C./W, which corresponds to an airflow of 29 CFM. Row 603 shows that a fan speed of 100% results in a thermal resistance of 0.233° C./W, which corresponds to an airflow of 69 CFM. In an embodiment, a linear equation can be generated using curve-fitting techniques to approximate the relationship between fan speed and airflow, and this equation can be stored at BMC 180.

During operation of information handling system 100, BMC 180 can use the linear equation to determine a rate of airflow presently exhausting from system 100 based on a speed of fan(s) 212 at that time. The airflow measurement can be provided to data the center cooling system. Typically, the full complement of information handling systems included at a data center can each provide their respective airflow values based on their individual fan speeds, allowing the data center cooling system to determine a total airflow exiting all systems, and regulating the cooling system accordingly.

Figure 7:
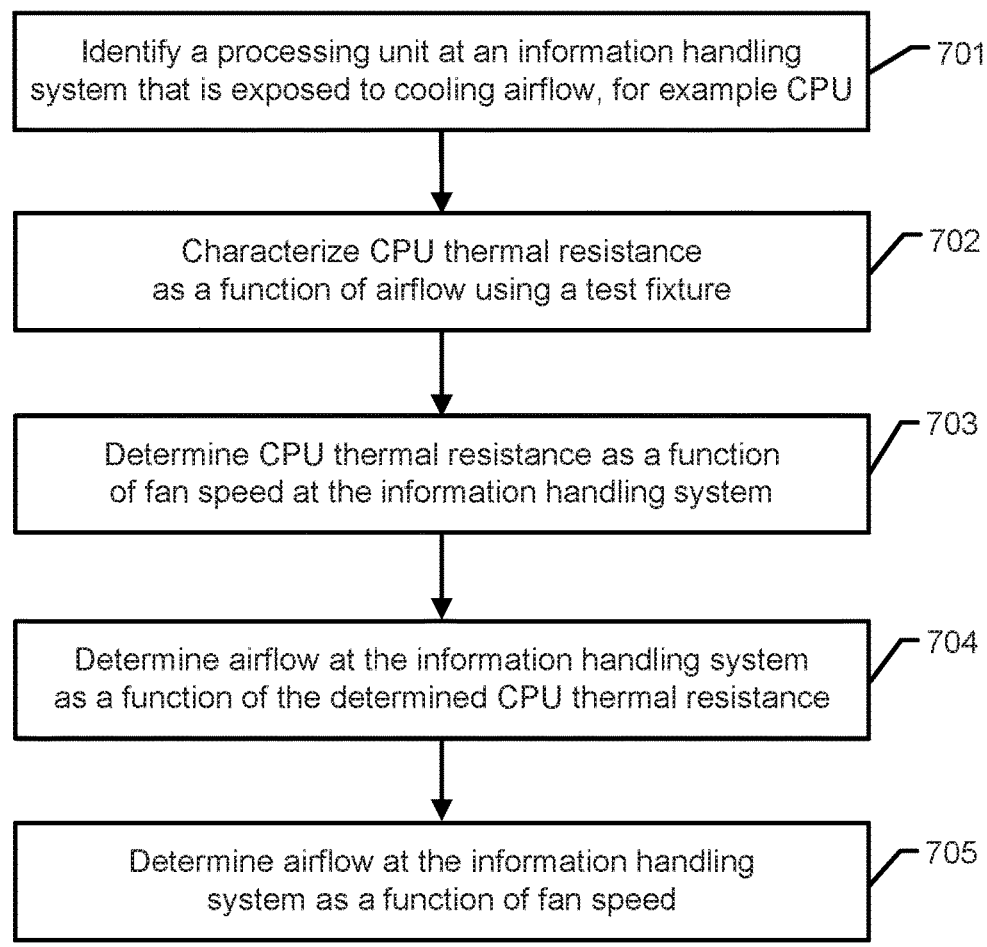
FIG. 7 is a flow diagram illustrating a method for determining airflow as a function of fans speed at an information handling system, according to a specific embodiment of the present disclosure.

FIG. 7 shows a method 700 for determining airflow as a function of fans speed at an information handling system according to a specific embodiment of the present disclosure. Method 700 begins at block 701 where a processing unit exposed to cooling airflow at an information handling system is identified. For example, the location of CPU 102 at mainboard 220 is typically selected so that CPU 102 encounters a significant majority of airflow within enclosure 210. Method 700 continues at block 702 where a test fixture is used to characterize thermal resistance of the CPU as a function of airflow, as described with reference to FIG. 3. At block 703, the thermal resistance of the CPU included at an information handling system is determined as a function of fan speed, as described above with regard to FIG. 4. As noted above, information handling system 100 is fully configured to include all components that affect airflow impedance within enclosure 210. The measurements can be performed during manufacture of information handling system 100 by the OEM, or alternatively the measurements can be performed after installation of the system at a data center or another end-user facility.

Method 700 continues at block 704, where airflow at the information handling system as a function of the CPU thermal resistance is determined. For example, graph 500 at FIG. 5 illustrates associating the thermal resistance measurements performed at block 703 with the characterization data provided at block 702. Method 700 concludes at block 705 where airflow at the information handling system as a function of fan speed is determined, as described above with reference to FIG. 6. For example, BMC 180 can determine a rate of airflow being exhausted from information handling system 100 based on a current speed of fan(s) 212. BMC 180 can communicate the airflow value to a data center cooling system, and the like, which can use the airflow information to regulate operation of the cooling system. In an embodiment, the airflow values determined at block 705 can be adjusted upward by a predetermined amount to compensate for various factors that affect the accuracy of method 700, for example to compensate for a portion of airflow at enclosure 210 that does not influence the thermal resistance of CPU 102, and the like. In an embodiment, the measurements and calculations performed at blocks 702-705 can be repeated periodically to compensate for degraded fan operation, and the like.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first component including a thermal sensor and a heat sink;
   a chassis including a first fan to exhaust air from the chassis; and
   a baseboard management controller (BMC) to:
      receive characterization data identifying:
         a first thermal resistance of an instance of the first component at a test fixture, the first thermal resistance corresponding to a first airflow; and
         a second thermal resistance of the instance of the first component at the test fixture, the second thermal resistance corresponding to a second airflow;
      determine first data including:
         a first thermal resistance of the first component at the information handling system, the first thermal resistance corresponding to a first fan speed at the information handling system; and
         a second thermal resistance of the first component at the information handling system, the second thermal resistance corresponding to a second fan speed at the information handling system; and
      determine a relationship between fan speed and airflow at the information handling system based on the first data and the characterization data.

2. The information handling system of claim 1, wherein determining the relationship includes determining the first airflow at the information handling system based on the first thermal resistance, the first fan speed, and the characterization data, and determining the second airflow at the information handling system based on the second thermal resistance, the second fan speed, and the characterization data.

3. The information handling system of claim 1, wherein the BMC is further to estimate airflow exiting the information handling system at a first time based on a fan speed at the information handling system chassis at the first time.

4. The information handling system of claim 1, wherein the BMC is further to configure a computational workload executing at the information handling system while determining the first data.

5. The information handling system of claim 1, wherein the BMC is further to:
   determine a fan speed at the information handling system at a first time;
   determine a measure of airflow exiting the information handling system based on the fan speed at the first time; and
   provide the measure of airflow to a data center cooling system.

6. The information handling system of claim 1, wherein the first component is a central processing unit installed at a main board of the information handling system.

7. The information handling system of claim 1, wherein the first component is a platform controller hub installed at a main board of the information handling system.

8. The information handling system of claim 1, wherein the first component is a memory module installed at main board of the information handling system.

9. The information handling system of claim 1, wherein the BMC is further to generate a linear equation expressing the relationship between fan speed and airflow at the information handling system.

10. A method comprising:
   identifying a first component at a first information handling system based on proximity to airflow during operation of the first information handling system;
   receiving characterization data identifying:
      a first thermal resistance of a first instance of the first component at a test fixture, the first thermal resistance corresponding to a first airflow; and
      a second thermal resistance of the first instance of the first component at the test fixture, the second thermal resistance corresponding to a second airflow;
   determining first data including:
      a first thermal resistance of a second instance of the first component at a second information handling system, the first thermal resistance corresponding to a first fan speed at the second information handling system; and
      a second thermal resistance of the second instance of the first component at the second information handling system, the second thermal resistance corresponding to a second fan speed at the second information handling system; and determining a relationship between fan speed and airflow at the second information handling system based on the first data and the characterization data.

11. The method of claim 10, wherein determining the relationship comprises:

determining a first airflow at the second information handling system based on the first thermal resistance and the first fan speed at the second information handling system, and based on the characterization data; and determining a second airflow at the second information handling system based on the second thermal resistance and the second fan speed at the second information handling system, and based on the characterization data.

12. The method of claim 10, further comprising configuring a computational workload executing at the second information handling system while determining the first data.

13. The method of claim 10, further comprising:

determining a fan speed at the second information handling system at a first time;

determining a measure of airflow exiting the second information handling system based on the fan speed at the first time; and providing the measure of airflow to a data center cooling system.

14. The method of claim 10, further comprising:

generating a lookup table representing the characterization data; and storing the lookup table at the second information handling system.

15. The method of claim 10, wherein the first component is a central processing unit installed at a main board of the second information handling system.

16. The method of claim 10, wherein determining the first data and determining the relationship is performed by a baseboard management controller included at the second information handling system.

17. The method of claim 10, further comprising generating, at a baseboard management controller, a linear equation expressing the relationship between the fan speed and the airflow at the second information handling system.

18. A method comprising:

receiving characterization data identifying:

a first thermal resistance of a first instance of a first component at a test fixture, the first thermal resistance corresponding to a first airflow; and a second thermal resistance of the first instance of the first component at the test fixture, the second thermal resistance corresponding to a second airflow;

determining, at a baseboard management controller (BMC) at an information handling system, first data including:

a first thermal resistance of a second instance of the first component at the information handling system, the first thermal resistance corresponding to a first fan speed at the information handling system; and a second thermal resistance of the second instance of the first component at the information handling system, the second thermal resistance corresponding to a second fan speed at the information handling system;

determining at the BMC a first airflow at the information handling system based on the first thermal resistance and the first fan speed at the information handling system, and based on the characterization data; and determining at the BMC a second airflow at the information handling system based on the second thermal resistance and the second fan speed at the information handling system, and based on the characterization data.

19. The method of claim 18, further comprising estimating airflow exiting the information handling system at a first time based on a fan speed at the information handling system chassis at the first time.

20. The method of claim 18, further comprising configuring a computational workload executing at the information handling system while determining the first data.

* * * * *